Figure 1:
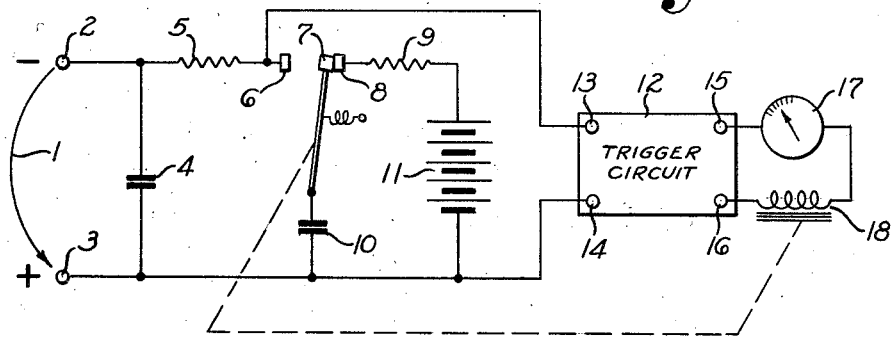

Feb. 12, 1957  F. W. MITCHELL, JR., ET AL  2,781,490
COULOMETER
Filed Jan. 7, 1952

INVENTORS.
FERN W. MITCHELL, JR.
PHILIP A. SHAFFER, JR.
BY THEIR ATTORNEYS.
HARRIS, KIECH, FOSTER & HARRIS
BY

United States Patent Office 2,781,490
Patented Feb. 12, 1957

2,781,490

COULOMETER

Fern W. Mitchell, Jr., Easton, Pa., and Philip A. Shaffer, Jr., Pasadena, Calif.

Application January 7, 1952, Serial No. 265,336

6 Claims. (Cl. 324—111)

The present invention relates in general to coulometry and, more particularly, to a method of and apparatus for measuring the electric charge delivered to a load circuit in which the charge is used.

Conventionally, electrochemical coulometers are employed where great accuracy is desired, but these require precision weighing, a precision volumetric measurement, or, if a gas is evolved, applying suitable corrections for pressure, temperature and the like, or some other type of chemical determination of a liberated chemical substance. Also, continuous readings cannot be obtained. Other coulometers conventionally employed require that a constant current be maintained, the lapsed time being measured accurately to obtain the total charge delivered. However, such coulometers cannot be used where varying currents are imposed thereon by the load circuit, or where the operator desires to vary, e. g., reduce, the current, as in approaching the end point of an electrolysis.

In view of the foregoing, a primary object of this invention is to provide a coulometer which is entirely electrical and electronic and which is capable of supplying current to the load circuit without objectionable fluctuations, preferably at a constant voltage, which provides a continuous reading, which is capable of integrating very small currents, and which is extremely accurate.

An important object of the invention is to meter an electric charge in discrete increments of substantially equal size so that the total charge in a given interval of time may be determined by counting the number of increments. A related object is to deliver the charge to the load circuit smoothly, even though it is metered in discrete increments within the coulometer itself.

Another object is to provide a coulometer wherein a condenser is alternately charged to an upper equilibrium potential and discharged to a lower equilibrium potential, the condenser being discharged into the load in which the charge is used, which is an important feature.

Another object is to provide a ballast condenser connected for discharge at a controlled potential into the load circuit and to provide a transfer condenser which is alternately connected across a source of substantially constant potential and to the ballast condenser so as to alternately charge the transfer condenser to an upper equilibrium potential determined by the source and to discharge it to the ballast condenser.

An important object is to provide a trigger circuit responsive to a decrease in the charge on the ballast condenser to a predetermined minimum for disconnecting the transfer condenser from the potential source and for connecting it to the ballast condenser so that the transfer condenser always discharges to a substantially constant lower equilibrium potential. Thus, the transfer condenser transfers substantially equal increments of charge to the ballast condenser, the latter serving to smooth out the flow of charge to the load circuit, which are important features of the invention.

Another object is to provide a counting device actuable by the trigger circuit for counting the number of transfers of charge from the transfer condenser to the ballast condenser, or differently expressed, for counting the number of excursions of the charge on either the transfer condenser or the ballast condenser between the upper and lower limits of the charges thereon. A related object is to provide such a counting device which is connected in circuit with the trigger circuit so as to be actuable by the trigger circuit whenever the latter responds to a decrease in the charge on the ballast condenser to the predetermined minimum value discussed previously.

Another object is to provide a coulometer which includes an amplifier stage for amplifying the signal delivered to the trigger circuit by the ballast condenser, the purpose of the amplifier stage being to stabilize the triggering voltage, which is an important feature.

An important feature of the present invention is that its accuracy is not affected by variations in the rate at which the measured charge flows. In the coulometer of the present invention, if the rate of charge flow increases, the number of charge transfers from the transfer condenser to the ballast condenser in a given interval of time increases accordingly.

In the preferred form of the invention, the total charge delivered to the load circuit is indicated directly and continuously on a counter mechanism, or the like. Thus, in contrast to prior electrochemical methods involving, for example, a weighing operation, the total charge may be read at any time without interruption of the action of the load circuit, which may be an electrolysis cell, or which may include a condenser whose capacity is being measured, or the like. In contrast to prior electrolytic methods involving gas generation, the reading of the indicator requires no correction for pressure, temperature or other parameters. It need only be multiplied by an empirically determined scale factor to be converted to any desired units of electrical charge, and this scale factor may be varied within wide limits depending upon the units desired.

As mentioned earlier, the inherent accuracy of the present invention is not affected by variations in the rate at which the charge is delivered to the load circuit. An important advantage results from this in that the current passing may be varied within wide limits without impairing the accuracy of the determination, thus, for example, allowing the end point of an electro-chemical analysis to be approached slowly.

The foregoing advantages accrue because the charge is transferred in the form of discrete, accurately measured increments, which are determined by electrical components whose precision can be controlled. In the present invention, the integration of current or charge flow is performed by a condenser which alternately accumulates charge up to a fixed equilibrium value of potential, and alternately discharges to a constant lower level of potential. Integration of current in the sense of the prior art may be considered to correspond to the integration from an initial charge content to a continuously variable end condition, the final magnitude of the charge being determined by the potential across the condenser. The measurement of this potential is beset with uncertainties, including among others, the linearity of potential indication. In the present invention, it is sufficient to note accurately only the two limiting potentials, the capacitance of the transfer condenser and the number of times the excursion between these potentials has been repeated.

Figure 2:
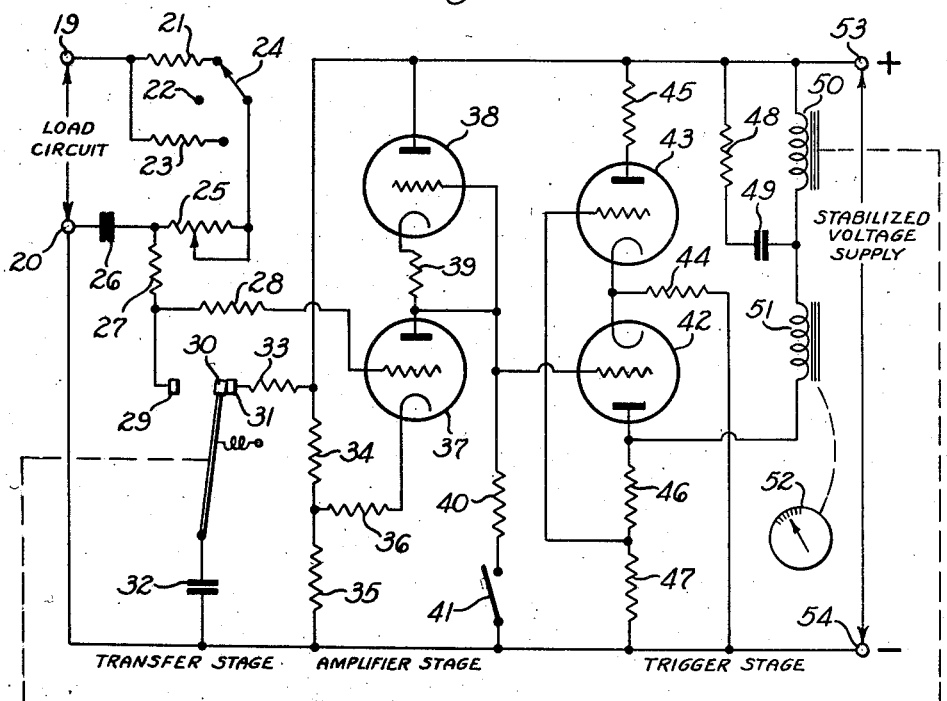

The foregoing objects and advantages of the present invention, together with various other objects and advantages which will become apparent, may be attained with the exemplary embodiments of the invention which are illustrated in the accompanying drawing and which are described in detail hereinafter. Referring to the drawing:

Fig. 1 is a diagrammatic view of a simplified embodiment of a coulometric apparatus of the invention; and Fig. 2 is a diagrammatic view of a preferred embodiment thereof.

Referring to Fig. 1 of the drawing, illustrated therein is a circuit having terminals 2 and 3 to which a load circuit, not shown, may be connected, flow through the load circuit from the terminal 2 to the terminal 3 being indicated diagrammatically by the arrow 1. The load circuit may comprise an electrolysis cell, an electrometer to be calibrated, a condenser whose capacity is to be determined, or the like. The coulometric circuit of Fig. 1 also includes a ballast condenser 4 adapted to be connected for discharge into the load circuit, and includes a transfer condenser 10 which is adapted to be connected across the ballast condenser 4 through a resistor 5 by a switch means which comprises stationary contacts 6 and 8 and a movable contact 7. The latter is mounted on the armature of a relay which includes a coil 18, the connection between the coil and the armature being indicated diagrammatically. As will be apparent, when the contact 7 engages the contact 6, the transfer condenser 10 is connected across the ballast condenser 4. When the contact 7 is in engagement with the conact 8, the transfer condenser 10 is connected across a battery 11, or other source of substantially constant potential, through a resistor 9. Connected across the ballast condenser 4 is a trigger circuit or trigger means 12 which is responsive to a predetermined minimum value of potential across the ballast condenser, the trigger circuit including, for example, one or more triodes having a grid or grids responsive to the potential across the condenser 4. The trigger circuit 12 is shown as having terminals 13 and 14 to which leads for connecting it across the ballast condenser 4 are attached. The trigger circuit is also shown as having terminals 15 and 16 to which the coil 18 and an indicating device 17 are connected. The indicating device 17 is preferably an impulse counting device, such as an electromagnetic counter.

Considering the operation of the embodiment of Fig. 1, the relay coil 18 is normally de-energized so that the contact 7 is in engagement with the contact 8, whereby the transfer condenser 10 is charged to equilibrium with the potential of the battery 11, which is substantially constant. When the relay coil 18 is energized, the contact 7 moves over into engagement with the contact 6 and the transfer condenser 10 discharges through the resistor 5 into the ballast or output condenser 4 and the load circuit represented by the arrow 1. The condenser 10 charges to the equilibrium potential of the battery 11 since the engagement of the contacts 7 and 8 is maintained until the charging current through the resistor 9 has reached a negligible value, the purpose of this resistor being to limit the charging current flowing through the relay contacts. The voltage to which the transfer condenser 10 discharges is determined by the triggering voltage of the trigger circuit 12 in a manner which will be discussed in detail in the following paragraphs. Consequently, the transfer condenser 10 transfers a fixed amount of charge through the resistor 5 each time the relay is energized, the amount of charge transferred being $C \Delta E$, where $C$ is the capacitance of the condenser 10, and $\Delta E$ is the difference in potential between the battery 11 and the triggering potential of the trigger circuit 12. The exact capacitance of the condenser 10, and the exact potential difference, need not be predetermined. However, it is necessary to determine the product of these quantities, and this is readily done by calibration in any suitable manner.

It should be pointed out that the charge on the ballast condenser, i. e., the condenser 4, which actuates the trigger circuit is preferably only slightly less than the charge on the ballast condenser after it has been recharged by a charge transfer from the transfer condenser. Thus, the voltage applied to the load circuit is substantially constant, which is an important advantage in many load circuits with which the coulometer of the invention can be used.

Considering the operation of the embodiment of Fig. 1 in more detail, it will be assumed that no current is flowing in the load circuit 1. If the charge on the ballast condenser 4 is not sufficiently positive to prevent the trigger circuit 12 from operating, i. e., if the potential across the condenser 4 initially is less than the triggering potential of the trigger circuit, the relay coil 18 and the counter 17 will be energized repeatedly by pulses from the terminals 15 and 16, thus causing a repeated transfer of charge from the transfer condenser 10 to the ballast condenser 4 until the potential on the condenser 4 becomes sufficiently positive to prevent further operation of the trigger circuit. The latter is prevented from remaining in the triggered state by the positive pulses which it senses at the terminals 13 and 14 when the transfer condenser 10 is suddenly discharged through the resistor 5. If no current flows through the load circuit 1, the apparatus remains inactive, once it has charged the ballast condenser 4 up to its operating potential. Thus, the dial reading of the counter 17 may be observed in this condition as an initial reading. It will now be assumed that charge flows, in a positive sense, from the terminal 2 to the terminal 3 through the load circuit 1. Such flow first results in a depletion of the charge on the ballast condenser 4 and a subsequent lowering of the potential applied at the terminals 13 and 14 of the trigger circuit 12. This potential will continue to drop until the triggering voltage of the trigger circuit 12 is attained, whereupon the counter 17 and the relay coil 18 will be energized and a definite increment of charge transferred to the condenser 4. The charge increment transferred from the transfer condenser 10 to the ballast condenser 4 increases the potential of the ballast condenser above the critical triggering potential and the trigger circuit does not operate again until the potential decreases to the predetermined minimum value of the triggering potential.

The accuracy of the embodiment illustrated in Fig. 1 depends upon the constancy of both $C$ and $\Delta E$ within a predetermined permissible error range. The value of $C$, which, as hereinbefore discussed, is the capacitance of the transfer condenser 10, may be stabilized by the selection of high quality components and by various well known techniques. However, $\Delta E$, which, as hereinbefore discussed, is the potential difference between the battery 11 and the triggering potential of the trigger circuit 12, will be constant only when, disregarding fortuitous compensation of errors, the charging potential of the source 11 is stable to the required degree and the triggering voltage of the circuit 12 does not vary more than permissible. The charging potential of the source 11 may be stabilized to the required degree in various ways well known in the art and the triggering voltage of the trigger circuit 12 may be stabilized in a manner hereinafter discussed in detail in connection with Fig. 2 of the drawing. Of course, it will be understood that the contacts 7 and 8 must be maintained in engagement for a sufficient length of time to charge the transfer condenser 10 to the potential of the source 11 through the resistor 9, and the contacts 6 and 7 must remain in engagement for a time sufficient to complete the charge transfer from the condenser 10 to the ballast condenser 4. Also, the time interval during which the contacts 6 and 7 are in engagement must be shorter than the time required for the ballast condenser 4 to discharge through the external circuit 1 to an extent corresponding to a potential decrement equal to the permissible error in $\Delta E$. This may be expressed by the equation $$t \doteq R_1(C_4 + C_{10}) \text{ (permissible fractional error in } \Delta E)$$

where $t$ is the engagement time of the contacts 6 and 7, $R_1$ is the effective load resistance, and $C_4$ and $C_{10}$ are the capacities of the condensers 4 and 10.

In order to stabilize the triggering potential, we have found it desirable to employ a voltage amplifier between the ballast condenser and the trigger circuit. By this means the apparent variation in triggering potential is divided by the overall gain of the amplifier. An embodiment of the invention incorporating such an amplifier stage is illustrated in Fig. 2 of the drawing.

Referring thereto, the embodiment illustrated includes terminals 19 and 20 for connection to a load circuit, terminals 53 and 54 for connection to a stabilized voltage supply, a ballast condenser 26, a transfer condenser 32, a condenser 49, resistors 21, 23, 27, 28, 33, 34, 35, 36, 39, 40, 44, 45, 46, 47 and 48, a variable resistor or potentiometer 25, a selector switch 24 having an off position 22, a normally open switch 41, a relay having a coil 50 and having an armature operatively connected to the coil and carrying a contact 30 which is movable between contacts 29 and 31, an impulse counter having a coil 51 and a dial 52, and four triodes 37, 38, 42 and 43. These elements are connected in circuit in a way which will be readily apparent from Fig. 2 of the drawing.

The overall circuit of Fig. 2 may be considered to be composed of three sections or stages, viz., a transfer stage in which the charge is metered out in known increments by the relay in combination with the transfer condenser 32, an amplifier stage which improves the sensitivity of the trigger circuit and which stabilizes the triggering voltage so as to lessen the importance of drift therein, and a trigger stage which actuates the relay coil 50 and the counter coil 51.

The load circuit, not shown, to which the charge metered by the embodiment of Fig. 2 is delivered for use may be connected to the terminals 19 and 20. The role of the battery 11 of the embodiment of Fig. 1 is taken by a stabilized voltage supply connected to the terminals 53 and 54. This supply also provides the plate power for the vacuum tubes 37, 38, 42 and 43. The cathode heaters and leads therefor are not shown.

The flow of charge in the circuit is controlled by the selector switch 24, the potentiometer 25 and by electromotive forces, impedances, and the like in the load circuit. As previously mentioned, the selector switch may be moved to an "off" position 22, or it may be moved to positions wherein it inserts the resistors 21 and 23, respectively. For example, the value of the resistor 21 may be such as to permit the maximum charge flow for which the circuit is designed. Conversely, the resistor 23 may have a relatively high resistance value to limit charge flow to a low rate, which is desirable in approaching an end point in an electrolytic process, for example. The potentiometer 25 may be adjusted with the resistor 21 in the circuit to provide the desired counting rate, i. e., to provide the desired rate of energization of the countr coil 51, and the potentiometer 25 may also be used to vary the current during the run. As mentioned earlier, the condenser 26 is the ballast or output condenser which provides the necessary charge for maintaining current flow to the load between actions of the trigger circuit, known increments of charge being transferred to the ballast condenser 26 from the transfer condenser 32 in a manner similar to that discussed in connection with Fig. 1. The resistor 27 provides a positive pulse at the grid of the tube 37 when the transfer condenser 32 is discharged through it into the ballast condenser 26, the resistor 28 minimizing charge losses by grid-cathode conduction in the tube 37. As will be apparent, the known charge increment is delivered to the ballast condenser 26 whenever the relay coil 50 is energized to disengage the contact 30 from the contact 31 and move it into engagement with the contact 29. The resistor 33 in series with the contact 31 limits the charging current flowing into the transfer condenser 32 from the terminal 53, the charging circuit being completed through the ground or negative branch of the circuit via the terminal 54.

The resistors 34 and 35 provide a voltage divider for partial biasing of the cathode of the tube 37 with respect to ground, i. e., with respect to the terminal 54. Additional bias is provided by the flow of plate current through the resistor 36. This resistor cannot be used to provide all of the required bias since this would result in undesirably large degeneration and would make necessary the use of an equally large resistor at 39. It is a requirement of the series-ballast type of amplifier illustrated that the resistors 36 and 39 be as nearly equal as is convenient. The use of the resistor 39 for self-biasing of the tube 38 results in stabilization of the common plate current flowing in the tubes 37 and 38 while providing a voltage gain of approximately $\mu/2$ from the grid of the tube 37 to the plate of this tube, $\mu$ being the amplification factor of the tube. It is necessary that the tubes 37 and 38 have as nearly similar characteristics as possible in order to achieve the high stability obtainable from the amplifier stage.

The potential of the plate of the tube 37 is applied to the grid of the tube 42, this tube and the tube 43, together with the associated impedances, constituting what is known as a Schmidt trigger circuit, which is a direct coupled circuit having two stable regimes of operation. When the circuit is in a state in which the tube 43 is strongly conducting and the tube 42 is cut off, the circuit will be termed "off." When it is off, the high potential of the plate of the tube 42, dropped by the voltage divider composed of the resistors 46 and 47, is applied to the grid of the tube 43 and maintains this tube in a strongly conducting condition. If the grid of the tube 42 is now forced positive by the negative shift of the potential of the condenser 26, a point is reached at which the grid of the tube 42 rises above cut-off. The change in the plate current through the common cathode resistor 44 and the negative change in the plate potential of the tube 42 are both of the correct sign to reduce the conduction of the tube 43. The result of this action, together with the partial cancellation of the plate current changes of the two tubes at the resistor 44 and the resultant regeneration at the grid of the tube 42, is to produce a sudden transition to the regime in which the tube 42 is strongly conducting and the tube 43 is cut off. The plate current of the tube 42 is drawn from the power supply terminal 53 through the field coils of the relay 50 and the impulse counter coil 51 in series, and returned via the terminal 54. Current continues to flow through the tube 42 until the positive impulse originating from the discharge of the condenser 32 through the resistor 27 produces a triggering action in the other direction. This terminates the current flow through the coil 51 of the counter. The current flowing in the coil 50 of the relay is sustained for a longer period by means of the capacitor 49 and the damping resistor 48. If the sustaining resonance circuit is not used, the positive reset pulse causes the relay contact 30 to return to the contact 31, or normal, before the transfer condenser 32 has had sufficient time to discharge to its lower equilibrium potential. The resistor 45 serves to balance the operation of the trigger circuit so that the total plate current remains relatively constant.

The resistor 40 and the switch 41 are provided to trigger the circuit manually when the condenser 26 contains so little charge, as when the coulometer is first operated, that the positive pulse due to discharging of the condenser 32 through the resistor 27 is not sufficient to reset the trigger circuit and the relay becomes blocked in the "on" or "thrown" position. Several operations of the switch 41 result in the transfer of enough charge through the condenser 32 to the condenser 26 to place the coulometer in readiness for operation.

Although we have disclosed two exemplary embodiments of the invention herein for purposes of illustration, it will be understood that various changes, modifications and substitutions may be incorporated in the embodiments disclosed without necessarily departing from the spirit of the invention.

We claim as our invention:

1. In an apparatus for measuring the electric charge delivered to an external load circuit in which the charge is used, the combination of: a condenser; means for connecting said condenser to the load circuit so as to discharge said condenser into the load circuit; means responsive to a decrease in the charge on said condenser to a lower limit for charging said condenser to an upper limit, the difference between said upper and lower limits being small as compared to said limits themselves, said charging means including a second condenser, including a source of substantially constant potential, and including means for alternately connecting said second condenser in series with said source and in series with the first condenser defined; and means for counting the excursions between said limits.

2. In an apparatus for measuring the electric charge delivered to an external load circuit in which the charge is used, the combination of: a ballast condenser; means for connecting said ballast condenser to the load circuit so as to discharge said ballast condenser into the load circuit; a transfer condenser; a source of substantially constant potential; trigger means in circuit with said ballast condenser and responsive to a decrease in the charge on said ballast condenser to a predetermined minimum; switch means for alternately connecting said transfer condenser to said source and to said ballast condenser; means in circuit with said trigger means for actuating said switch means to connect said transfer condenser to said ballast condenser whenever the charge on said ballast condenser decreases to said predetermined minimum; and a counting device in circuit with said trigger means.

3. In an apparatus for measuring the electric charge delivered to an external load circuit in which the charge is used, the combination of: a ballast condenser; means for connecting said ballast condenser to the load circuit so as to discharge said ballast condenser into the load circuit; a transfer condenser; a source of substantially constant potential; a relay including a coil and including an armature carrying a contact movable from a first position to a second position upon energization of said coil, said contact connecting said transfer condenser to said source when in said first position and connecting said transfer condenser to said ballast condenser when in said second position; trigger means in circuit with said ballast condenser and responsive to a decrease in the charge on said ballast condenser to a predetermined minimum for energizing said coil of said relay, said coil being in circuit with said trigger means; and an impulse responsive device in circuit with said trigger means.

4. An apparatus as defined in claim 3 including amplifier means between said trigger means and said ballast condenser for amplifying the signal delivered to said trigger means by said ballast condenser.

5. An apparatus as defined in claim 2 wherein said decrease to said predetermined minimum is small as compared to said minimum.

6. An apparatus as defined in claim 3 wherein said decrease to said predetermined minimum is small as compared to said minimum.

References Cited in the file of this patent

UNITED STATES PATENTS

| | | |
|---|---|---|
| 1,830,170 | Lindenblad | Nov. 3, 1931 |
| 2,020,681 | Garstang | Nov. 12, 1935 |
| 2,113,011 | White | Apr. 5, 1938 |
| 2,473,542 | Philpott | June 21, 1949 |
| 2,586,589 | Willemse | Feb. 19, 1952 |
| 2,607,528 | McWhirter | Aug. 19, 1952 |
| 2,615,063 | Brown | Oct. 21, 1952 |
| 2,638,491 | Turner | May 12, 1953 |